United States Patent
Chatterjee

(10) Patent No.: US 9,357,059 B2
(45) Date of Patent: *May 31, 2016

(54) SYSTEM AND METHOD FOR ANONYMIZING A TELEPHONE NUMBER

(71) Applicant: CenturyLink Intellectual Property LLC, Denver, CO (US)

(72) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,876

(22) Filed: Oct. 8, 2015

(65) Prior Publication Data

US 2016/0028883 A1 Jan. 28, 2016

Related U.S. Application Data

(63) Continuation of application No. 11/526,549, filed on Sep. 25, 2006, now Pat. No. 9,185,205.

(51) Int. Cl.
| | |
|---|---|
| *H04M 1/64* | (2006.01) |
| *H04M 3/42* | (2006.01) |
| *H04L 12/58* | (2006.01) |
| *H04M 3/436* | (2006.01) |
| *H04W 12/02* | (2009.01) |

(52) U.S. Cl.
CPC .......... *H04M 3/42008* (2013.01); *H04L 51/04* (2013.01); *H04L 51/28* (2013.01); *H04M 3/436* (2013.01); *H04W 12/02* (2013.01)

(58) Field of Classification Search
CPC ................................. H04M 3/42008
See application file for complete search history.

(56) References Cited

U.S. PATENT DOCUMENTS

| | | | | |
|---|---|---|---|---|
| 5,875,240 | A | 2/1999 | Silverman | |
| 5,999,594 | A | 12/1999 | Mizoguchi et al. | |
| 6,738,461 | B2 * | 5/2004 | Trandal | H04M 3/42195 379/142.02 |
| 7,290,035 | B2 | 10/2007 | Mattathil | |
| 7,298,833 | B2 | 11/2007 | Klein et al. | |
| 7,474,432 | B1 | 1/2009 | Kirchhoff et al. | |
| 7,499,537 | B2 * | 3/2009 | Elsey | G06Q 10/109 379/218.01 |
| 7,646,860 | B2 * | 1/2010 | Brown | H04M 3/53308 379/142.01 |
| 7,715,544 | B1 | 5/2010 | Bilder et al. | |
| 7,743,247 | B1 | 6/2010 | Horgan et al. | |
| 8,140,389 | B2 | 3/2012 | Altberg et al. | |

(Continued)

OTHER PUBLICATIONS

U.S. Appl. No. 11/526,549; Final Rejection dated Oct. 25, 2013; 15 pages.

(Continued)

*Primary Examiner* — Joseph T Phan
(74) *Attorney, Agent, or Firm* — Swanson & Bratschun, L.L.C.

(57) ABSTRACT

A system and method for enabling a telephone number to be called in an anonymous manner by associating an identifier with the telephone number and providing for calling the number via the identifier. In one embodiment, the telephone call, including communication of the telephone number is performed using encryption. The identifier may be an email address or user identifier. Other users may call the telephone number via a website that operates as a virtual payphone, using software downloaded to a computer or other communication device, or by calling a voice portal, for example.

20 Claims, 12 Drawing Sheets

(56) References Cited

U.S. PATENT DOCUMENTS

| | | | |
|---|---|---|---|
| 8,243,895 B2* | 8/2012 | Jain | H04M 3/42331 379/177 |
| 8,687,785 B2* | 4/2014 | Katkam | H04M 3/38 379/188 |
| 8,964,951 B1* | 2/2015 | Brahm | G06Q 20/3674 379/142.05 |
| 9,185,205 B2 | 11/2015 | Chatterjee | |
| 2002/0122391 A1 | 9/2002 | Shalit | |
| 2003/0112948 A1 | 6/2003 | Brown et al. | |
| 2003/0147519 A1 | 8/2003 | Jain et al. | |
| 2005/0144239 A1 | 6/2005 | Mattathil | |
| 2006/0281407 A1* | 12/2006 | Deeds | H04M 1/274516 455/41.2 |
| 2007/0121863 A1 | 5/2007 | Nagel et al. | |
| 2007/0238472 A1 | 10/2007 | Wanless | |

OTHER PUBLICATIONS

U.S. Appl. No. 11/526,549; Final Rejection dated Mar. 17, 2015; 13 pages.

U.S. Appl. No. 11/526,549; Issue Notification dated Oct. 21, 2015; 1 page.

U.S. Appl. No. 11/526,549; Non Final Office Action dated Mar. 15, 2012; 13 pages.

U.S. Appl. No. 11/526,549; Non-Final Rejection dated Aug. 29, 2014; 13 pages.

U.S. Appl. No. 11/526,549; Notice of Allowance dated Jul. 7, 2015; 15 pages.

U.S. Appl. No. 11/526,549; Pre-Appeal Decision dated Feb. 25, 2014; 2 pages.

* cited by examiner

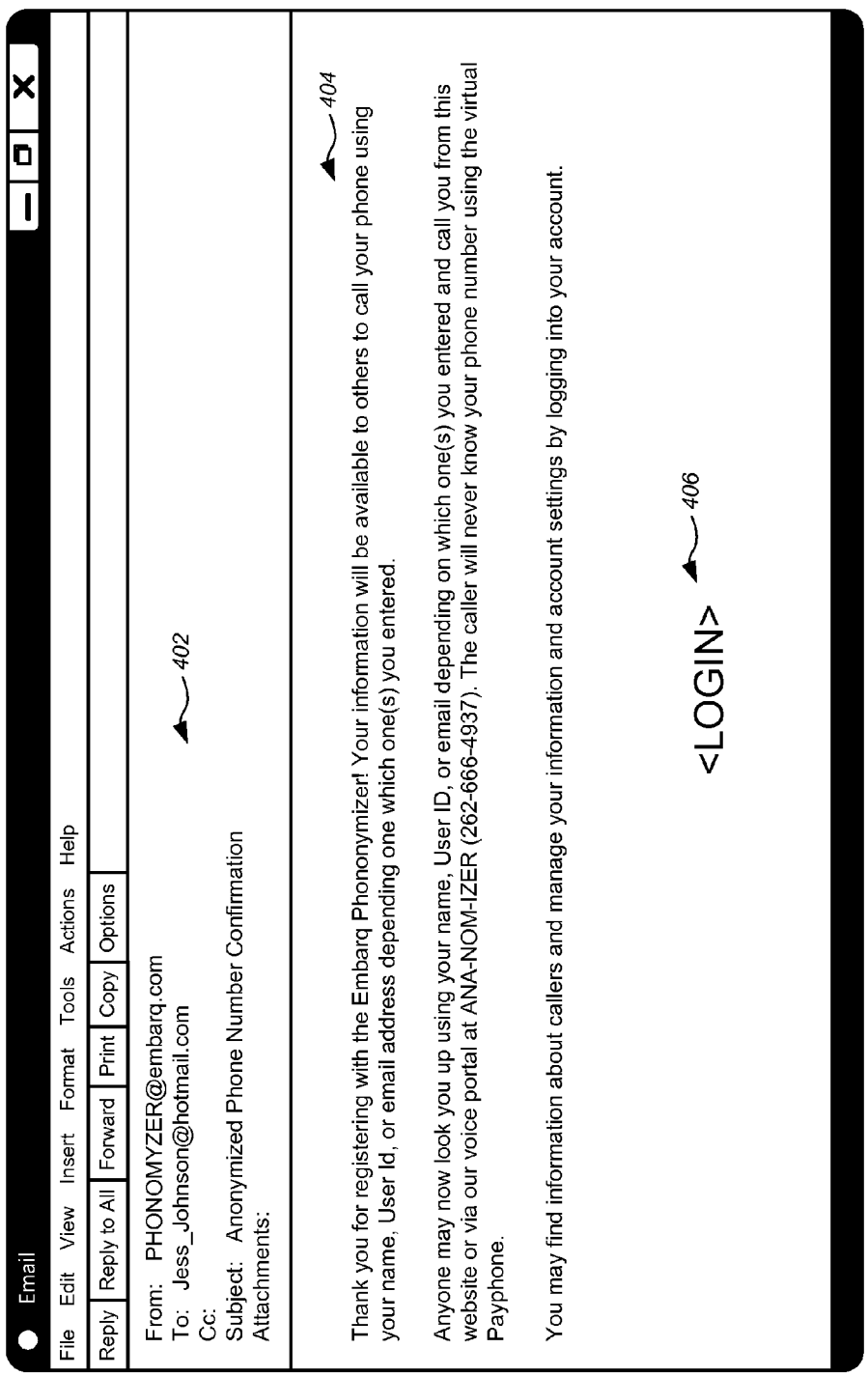

SYSTEM AND METHOD FOR ANONYMIZING A TELEPHONE NUMBER

CROSS REFERENCE TO RELATED APPLICATIONS

This application is a continuation of U.S. Pat. Application No. 11/526,549, filed Sep. 25, 2006 by Koushik Chatterjee and titled, "System and Method for Anonymizing a Telephone Number", which is hereby incorporated by reference in its entirety.

BACKGROUND

Online communities have become more prevalent in recent years. Some online communities have developed into personal websites to enable individuals to present their lives and communicate with others. Myspace.com is one example of an online community website. Other online community website examples include web-logs or "blogs," chat rooms, dating websites, message boards, and other online environments on which users may partake in posting, writing, communicating, or interacting with other online users. While the problems described are directed to online environments, similar problems exist for non-online situations.

A problem that exists for online users is anonymity when online users seek to have verbal communications apart from an online forum. While online forums can provide adequate anonymity between users to avoid problematic or dangerous situations (e.g., stalking or physical harm), a sensitive situation occurs at the time that two users decide to take an online relationship into a real world relationship. For example, in the case of an online dating site enabling two users to meet online, if those users decide to take a next step to have a telephone conversation, one of the users inevitably must provide the other user with his or her telephone number. Providing a telephone number, especially a home telephone number, can be problematic, if not dangerous, since a telephone number can be used to locate a physical address associated with that phone number using a reverse lookup telephone directory or other public or non-public method. As such, online users are generally hesitant in providing their telephone number to other online users even if a significant online relationship exists to avoid stalking and other difficult situations. As understood, a caller can protect his or her anonymity by pressing "*67" prior to placing the call to block his or her caller ID, but the callee does not have an option to block his or her phone number.

One system that has been developed to enable online users to communicate via the Internet using Internet Protocol (IP) "telephones" is provided by a company called SKYPE. This system allows users to download software to their computer and be listed in an online directory that other SKYPE subscribers can access. The online directory enables subscribers to list a user name that only other SKYPE subscribers can call. An IP address or telephone number is assigned to the SKYPE subscribers so that the subscribers can call one another by selecting the user via the directory or call using a phone list stored on his or her computer. While using an Internet Protocol system can provide some anonymity to users since an IP address is not listed in a public directory associating the IP address with a physical address, such a system provides little more than anonymity provided by online community systems and simply provides a telephone-like interface to users. Further, such an Internet Protocol system limits a user to interfacing via his or her computer, which is additionally problematic in the event of a power failure or computer problem.

Because of concerns of providing telephone numbers to other people for safety and security reasons, there is a need to enable online and non-online users to be able to have others contact them without providing a telephone number.

SUMMARY

To provide additional safety and security to online and non-online users, a system and method for individuals to enable others to contact them via a telephone without providing a telephone number may be utilized. The use of such a system provides safety to individuals as it substantially prevents others from learning of a user's home address via the telephone number.

One embodiment includes a system and method for establishing a user to receive telephone calls. The method includes receiving a telephone number from a user, receiving an identifier to be associated with the telephone number, and storing the telephone number in association with the identifier to enable another user to call a telephone associated with the number of the user using the identifier.

Another embodiment includes a system for enabling a user to be called anonymously. The system includes at least one computing device configured to establish a first subscriber as a customer of a first service provider including associating a telephone number with the first subscriber. A database may be in communication with the computing device(s) and configured (i) to store an identifier with the telephone number of the first subscriber and (ii) to output the telephone number in response to said database receiving a request from a second subscriber of a second service provider with the identifier to look up the telephone number associated with the first subscriber. The computing device(s) may further be configured to receive the looked up telephone number and establish a telephone connection between the first and second subscribers using the telephone number. Encryption may be used to conceal the telephone number used in the connection.

Yet another embodiment includes a method for receiving a telephone call anonymously. The method includes registering, by a first subscriber of a first service provider, an identifier in association with a telephone number. The registering causes the identifier and not the telephone number to be available to subscribers of a second service provider. A telephone call may be received from a second subscriber of the second service provider using the identifier to place the telephone call.

BRIEF DESCRIPTION OF THE DRAWINGS

Illustrative embodiments of the present invention are described in detail below with reference to the attached drawing figures, which are incorporated by reference herein and wherein:

FIG. 4 is an illustration of an exemplary email communicated to a user in response to the registration process of FIG. 3;

DETAILED DESCRIPTION OF THE DRAWINGS

Figure 1:
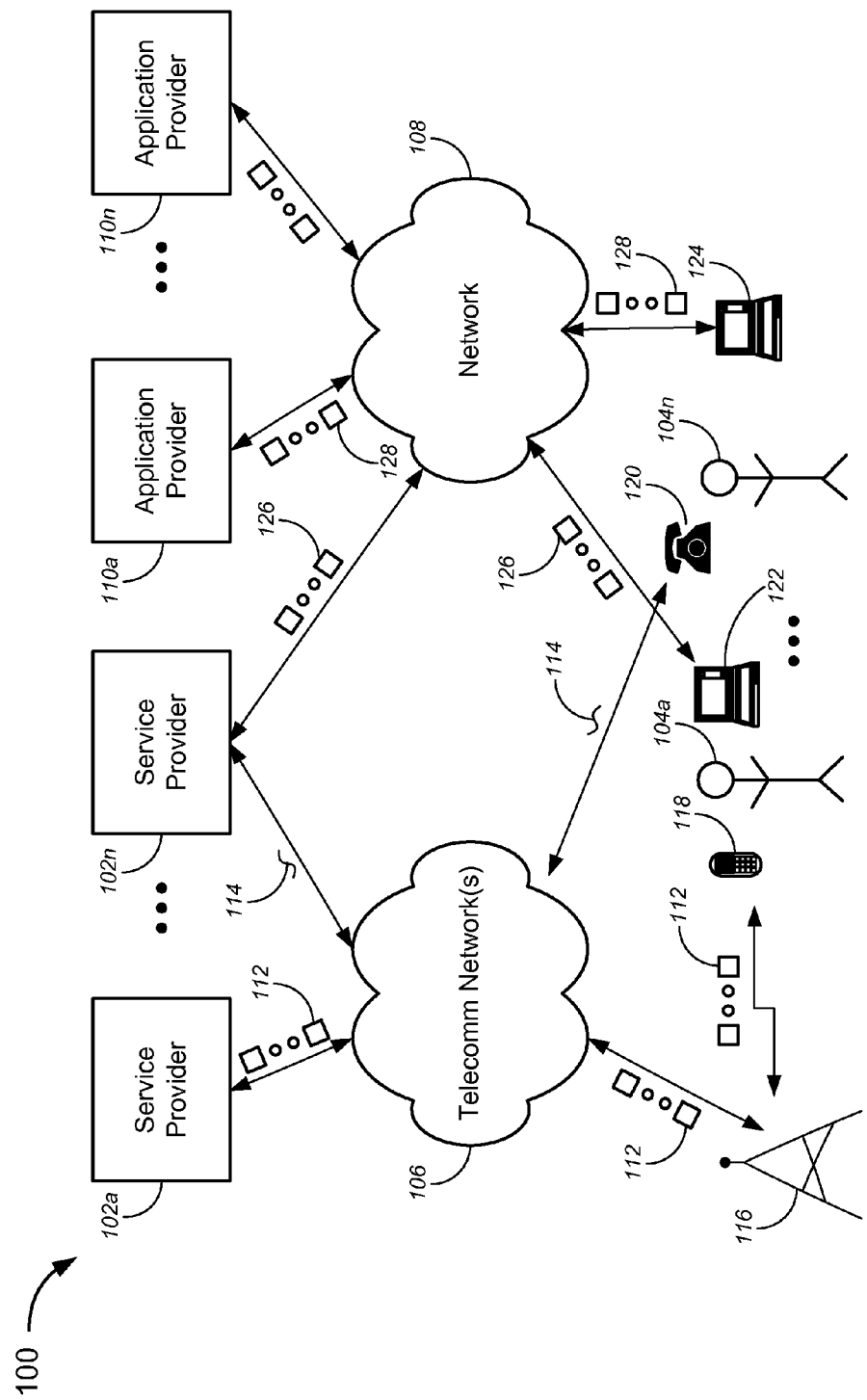
FIG. 1 is an illustration of an exemplary system for service providers and application providers to provide telecommunication, online communications, and online applications to users.

FIG. 1 is an illustration of an exemplary system 100 for service providers and application providers to provide telecommunication, online communications, and online applications to users.

Service providers 102a-102n (collectively 102) may be telecommunication service or other communication service providers that provide telecommunications or other communications to customers or subscribers 104a-104n (collectively 104). The service providers 102 provide their services to enable customers 104 to have telephone and other communication services over telecommunication network(s) 106, such as Public Switched Telephone Network (PSTN) and mobile telephone networks, and/or network 108. The network 108 may be the Internet.

Application providers 110a-110n (collectively 110) may host or otherwise provide applications that users, such as customers 104, may access and utilize for a variety of purposes. In one embodiment, the application providers 110 provide online community websites, such as myspace.com.

Users 104 may utilize telecommunications services provided by the service providers 102. The telecommunications may be performed via the telecommunication networks) 106 by communicating data packets 112 over the telecommunications network(s) 106 to a mobile telephone tower 116, to a mobile telephone 118 utilized by a subscriber 104a or from the telecommunications networks) 106 to a conventional telephone 120 via a signal 114, which may be an analog signal. In the case of the analog signal 114, the telecommunications network over which the signal is passed is likely to be the Public Switched Telephone Network (PSTN). In either case, both the mobile telephone 118 and telephone 120 have respective telephone numbers associated therewith. Each of these telephones are generally associated with home addresses of the users to which bills may be sent. In the case of the telephone 120, which is typically a home telephone, public telephone listings are available that can be accessed by the public to look up the telephone number and/or home address of the subscriber 104n.

Each of the subscribers 104a and 104n have computers 122 and 124, respectively, that may be used to access the network 108 for online or Internet activities. Data packets 126 may be used to communicate information via the network 108 to allow the subscriber 104a to perform online activities. Data packets 128 may include information communicated between an application provider 110a and user 104n using computer 124 while accessing an application hosted or otherwise provided by the application provider 110a.

In one embodiment, each of the subscribers 104a and 104n, who may also be considered users of a particular application may access the same application over the network 108. In the event that the application is an online community, such as a dating website, the users 104a and 104n may meet on the website. The meeting, of course, is a virtual meeting in that the two users 104a and 104n do not physically meet while using the application hosted by the application provider 108. In the event that the two users 104a and 104n decide to have a real world meeting, the users 104a and 104n may elect to first have a telephone conversation. In that event, either user 104a or user 104n must provide his or her telephone number to the other user. Because the telephone numbers of those users may be public information and listed in a directory or reverse lookup directory, the users 104a and 104n may be hesitant to share the telephone number with the other to avoid a problematic situation by allowing the other user to know or somehow obtain the physical address associated with the telephone number. In accordance with the principles of the present invention, one or both of the users 104a and 104n may register his or her telephone number with a service provider 104a, for example, or application provider 110a, for example, in conjunction with an identifier, such as an email address or user-established user identifier (user ID). Once one or both of the users register his or her telephone number to make that telephone number anonymous by allowing the identification associated with the telephone number to be used to make a telephone call, then the potential for determining the location of the user's residence may be significantly reduced or eliminated. The process for registering a telephone number to be called anonymously is further described herein below.

Figure 2:
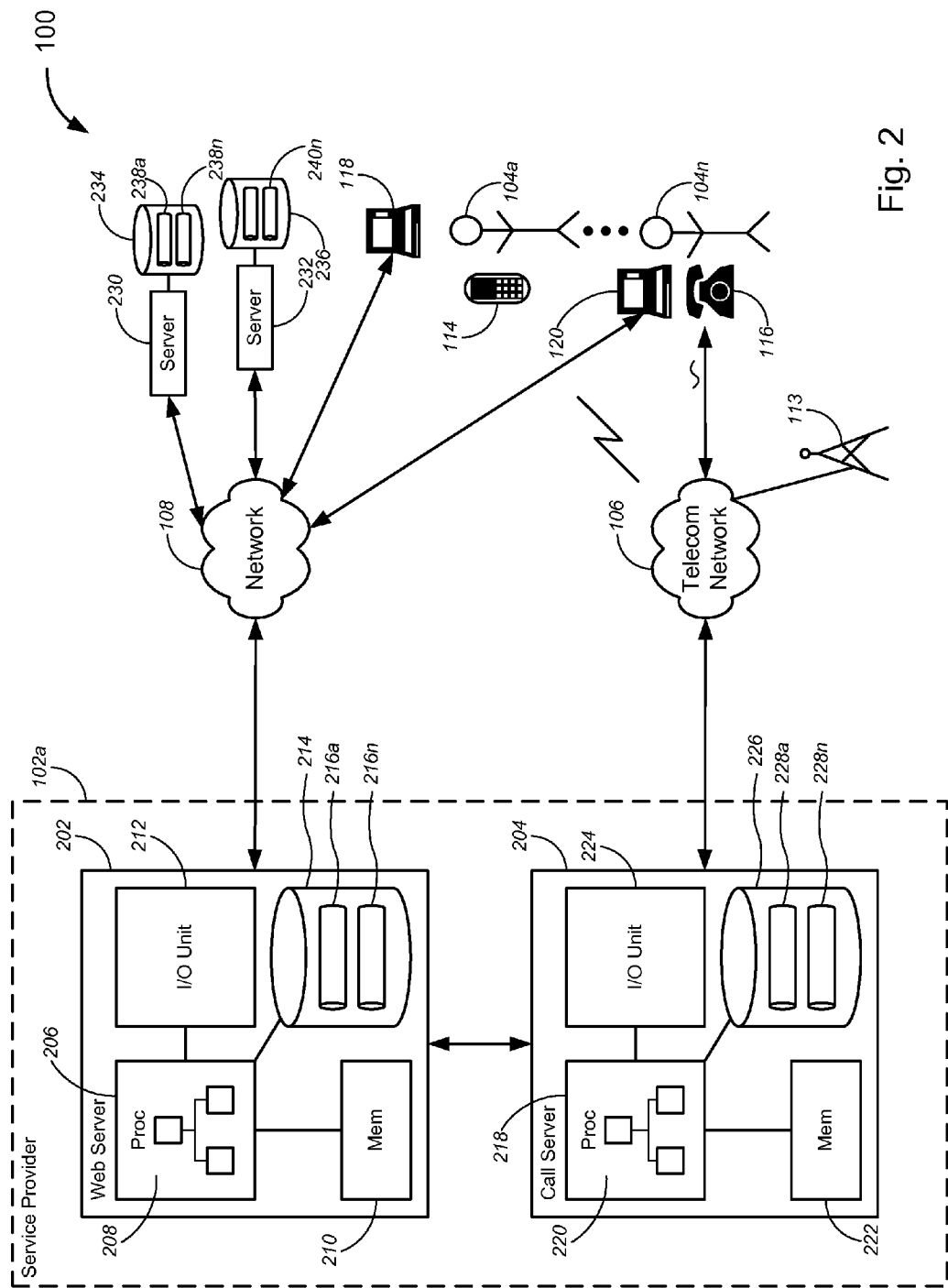
FIG. 2 is an illustration of an exemplary system for a service provider to provide online and/or telecommunications services to users.

FIG. 2 is an illustration of an exemplary system 100 for a service provider 102 to provide online and/or telecommunications services to users 104. The service provider 102a may operate a web server 202 and a call server 204. The web server 202 may include a processor 206 that executes software 208. The processor 206 may be in communication with memory 210, input/output (I/O) unit 212, and storage unit 214. The storage unit 214 may store one or more databases 216a-216n (collectively 216). The databases 216 may store information associated with subscribers of the service provider 102a. For example, the databases 216 may store telephone numbers, addresses, financial information, and other information associated with the subscribers. In accordance with the principles of the present invention, the same or additional databases 216 may be utilized to store registration information from subscribers or users who desire to make their telephone numbers anonymous through the use of identifiers (e.g., email addresses or user-established users IDs). It should be understood that the database that stores the information for enabling a user or subscriber to make his or her telephone number anonymous may be stored in the storage device 214 in the web server 202 or in another storage unit (not shown) external from the web server 202 and in communication with the web server 202.

The call server 204 may include a processor 218 that executes software 220. The processor 218 may be in communication with memory 222, I/O unit 224, and storage unit 226. The storage unit 226 may store databases 228a-228n (collectively 228). The software may include a voice response system, such as VOXEO®, Voice XML/IVR engine, to place calls and respond to responses by users, as understood in the art. The web server 202 and call server 204 may be in communication with one another such that information being collected and used by the two servers 202 and 204 may be shared.

In addition, servers 230 and 232 may be in communication with the network 108. The servers 230 and 232 may be in communication with storage units 234 and 236, respectively. The storage unit 234 may store one or more databases 238a-238n (collectively 238). Storage unit 236 may store one more databases 240a-240n (collectively 240). The databases 238 and 240 may be electronic number ("ENUM") databases, such as one managed by a company NeuStar®, as understood in the art. In addition, the databases may be managed by other service providers and accessed via the network 108 by the service provider 102. In one embodiment, the information associated with enabling a subscriber to make his or her telephone number anonymous via an identifier may be stored in one or more of the databases shown in FIG. 2.

In operation, the web server 202 may enable subscribers 104 to access a website hosted by the web server 202 or other server (not shown) in communication with the web server 202. The website may be accessed by the subscribers via personal computers or other electronic communication devices capable of accessing the web pages of the website. The users may utilize the website to register to make their telephone number(s) anonymous by providing an identification for other users to call those telephone numbers using the identifier without knowing the actual telephone number. In one embodiment, the software 208 may provide a "virtual payphone," whereby other users may call the registered subscribers or users who have made their telephone numbers anonymous using the associated identifiers. If the other users use the virtual payphone website interface, then the other users may use a computer with voice communication capabilities or other IP device that is capable of accessing a web page and have voice communication capability. Alternatively, the call server 204 may include software 220 that provides voice portal capabilities, whereby a user may call the voice portal and communicate the identifier information such that the call server 204 may connect the caller with the callee. Still yet, one embodiment causes software to be downloaded to a user's computer to operate as an encrypted telephone interface for placing calls to a user who has anonymized his or her telephone. In another embodiment, software may be downloaded to a mobile phone or other wireless communication device and enable a user to look up a user identifier and call the user without knowing the telephone number as the software may access a database that associates the user identifier with the user's telephone number. It should be understood that the call server 204 or another call server in communication with the web server 202 located elsewhere on the telecommunication network 106 and/or network 108 may be utilized in the same or similar manner.

Figure 3:
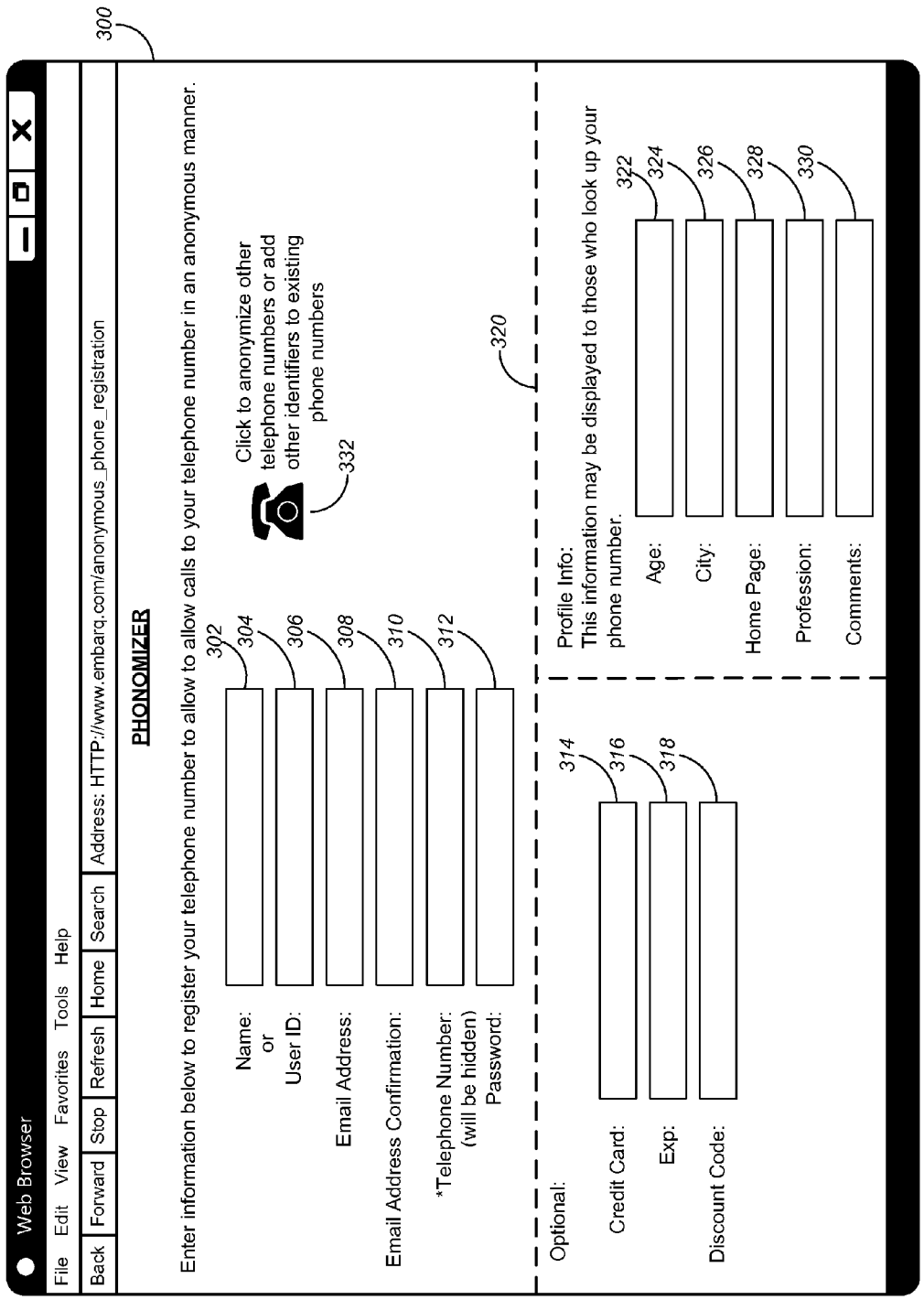
FIG. 3 is an illustration of an exemplary website for a user to register a telephone number in association with an identifier so that the telephone number can be called in an anonymous manner by another user by using the identifier to place the call.

FIG. 3 is an illustration of an exemplary website 300 for a user to register a telephone number in association with an identifier so that the telephone number can be called in an anonymous manner by another user calling the identifier. The website may include a number of text input fields, such as name 302, user ID 304, email address 306, and email address confirmation 308. Further, a text input field may be used to receive a user's telephone number 310. As indicated, the telephone number is hidden from other users attempting to call a user who has "anonymized" his or her telephone number. A text input field may be used to receive a password 312 so that the user may access his or her account to manage and view a telephone call history (see FIG. 8). In addition, depending upon how the system is configured, the website may enable a user to enter credit card information 314 and 316 and/or discount code information 318 via text input fields. The credit card information may be used to allow other users to call the user anonymizing his or her telephone number free of charge (e.g., 800 number or other number) and the discount code may be used to enable callers to call the registered user at a discount or no cost. However, one embodiment enables users to anonymize his or her telephone number free of charge.

In addition, the user who is anonymizing his or her telephone number may provide profile information in a portion 320 of the website. The profile information may provide for text input fields that include age 322, city 324, homepage 326, profession 328, and comments 330. It should be understood that other and/or different profile information may be requested from users. The profile information may be displayed when other users are looking up the user on a directory so that other users may confirm that the user he or she is attempting to call is, in fact, the person that they expected to be calling. Some or all of this information may be displayed depending upon who the calling party is or how the user sets up his or her account.

An icon or other indicia 332 may be provided to enable a user to select or click to anonymize other telephone numbers or add other identifiers to existing phone numbers. In other words, if a user has more than one telephone number, he or she may anonymize each of these telephone numbers and provide different identifiers for each of the phone numbers. As shown, the identifiers may include name, user ID, or email address. Any one of these identifiers may be used to contact the user via the associated telephone number. For example, the user who is anonymizing his or her telephone number may provide a user ID, such as a nickname or otherwise, and a user attempting to call the user may use a directory and enter the user ID to call the anonymous telephone number without knowing the telephone number. The user may also have multiple identifiers associated with a single telephone number so that the user who anonymizes his or her telephone number may use different user name on different websites and know that an incoming call is from another user from a particular website during an announcement prior to a call being connected as described further herein. For example, the user may use one user name on a dating website (e.g., match.com) and another user name on a personal profile webpage (e.g., myspace.com). The registration information entered by the user may be stored in the databases 216 (FIG. 2) of the service provider 102a or elsewhere.

FIG. 4 is an illustration of an exemplary email 400 communicated to a user in response to the registration process of FIG. 3. The email may include header information 402 to identify that the email was from phononymizer@embarq.com to jessjohnson@hotmail.com with a subject of "anonymized phone number confirmation." A message 404 may be communicated in the email 400 to the user to indicate that the user's telephone number has been anonymized. It further gives instruction to the user to let them know how other users can lookup and contact them using their identifier (e.g., name, user ID, or email address). As shown, the other users may access a website or voice portal to access a registry of user names to call the anonymized telephone number of the user. Further, the user may be provided link 406 to enable the user to log into his or her account to set up various aspects of his or her account.

Figure 5A:
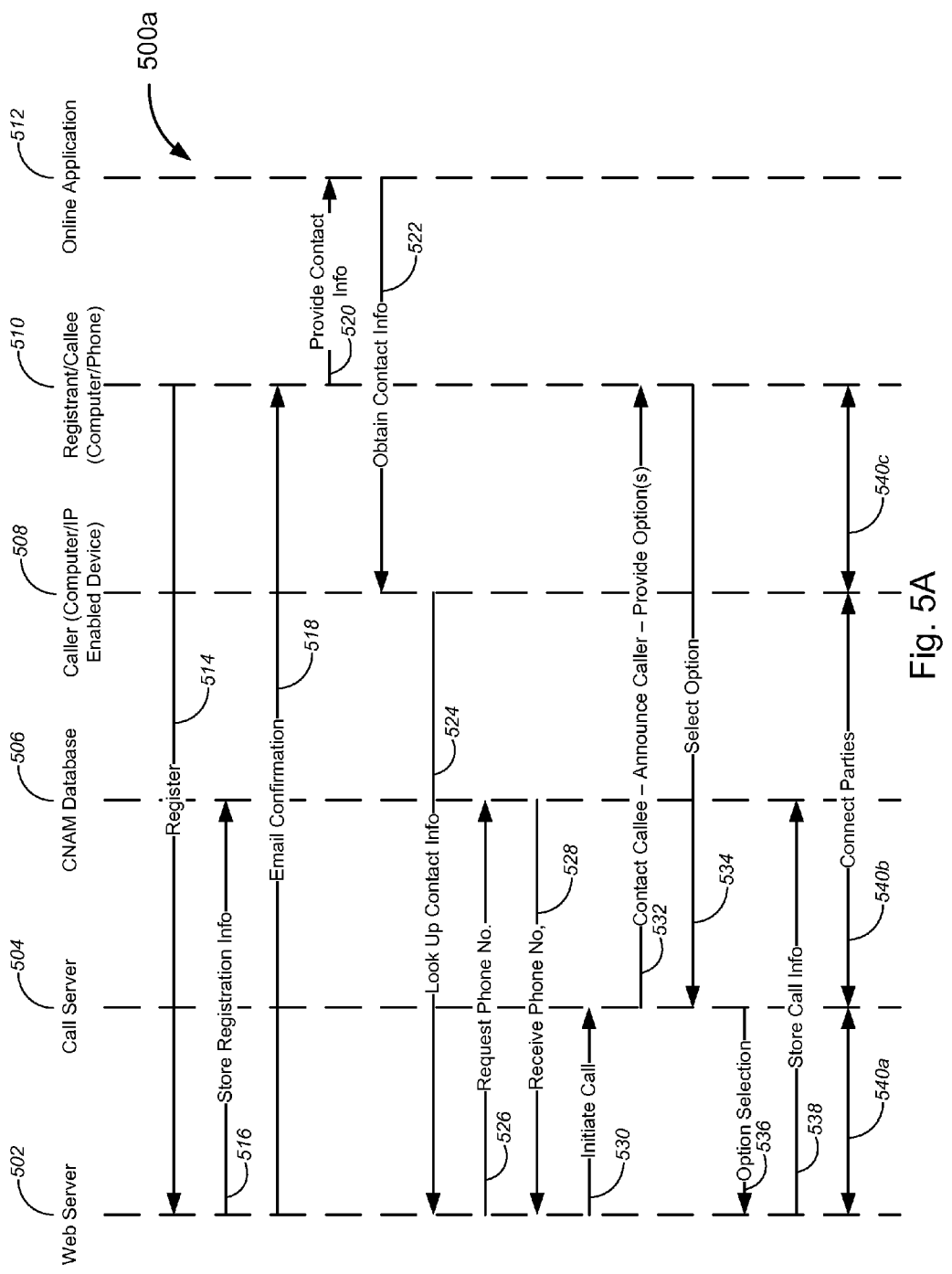
FIGS. 5A and 5B is a diagram of an exemplary interactive process for registering a telephone number to be called.

FIG. 5A is a diagram of an exemplary interactive processes 500a for registering a telephone number to be called anonymously. As shown, a number of components and users may be included as part of the process 500a. The components may include a web server 502, call server 504, and calling name (CNAM) database 506. The users or subscribers may include a caller 508, who may access the web server 502 and/or call server 504 using a computer or IP enabled device, and registrant/callee 510 who may access the web server and call server using a computer and telephone. In addition, an online application 512 may be provided by an application provider that the caller 508 and callee 510 may access via the Internet or otherwise.

The process starts at step 514 where the registrant/callee 510 registers. The registration may be performed via a computer accessing a website hosted by the web server 502. At step 516, registration information that is registered by the registrant 510 may be stored in the CNAM database 506. The registration information may include the registrant's name, telephone number, identifier, and so on. The web server 502 may send a confirmation email to the registrant 510 at step 518.

At step 520, the registrant 510 may access the online application 512 to communicate with the caller 508. It should be understood that the caller 508 and registrant/callee 510 may be users on an online community website, such as a dating service website. The registrant 510 may provide contact information to the caller 508 via the online application 512. For example, the registrant 510 may email the caller 508 on the online application 512. The contact information may be obtained by the caller 508 at step 522. It should be understood that the contact information may be provided from the registrant 510 to the caller 508 in many different ways depending on the type of communication being performed by the registrant 510 and caller 508. For example, if a software program is downloaded to the caller's computer to place calls to anonymized telephone numbers, then a caller can place the call via that software. The contact information may be an identifier to be used on a virtual payphone system or other communication interface to enable the caller 508 to call the callee 510 without knowing the callee's telephone number. At step 524, the caller 508 may look up contact information of the callee 510 via the web server 502 or enter the identifier in a text entry field to simply call the callee 510 (See FIG. 6). The web server 502 may request the telephone number at step 526 from the CNAM database 506. At step 528, the telephone number may be received by the web server 502. As shown, the telephone number is never communicated to the caller to ensure that the callee's telephone number remains anonymous. Encryption may be used to hide the telephone number from others on the network. The encryption may be used for the telephone number or for additional information (e.g., data of the conversation) being communicated over the network between the web server 502 and the callee and caller. The encryption technique may be in accordance with any encryption technique as understood in the art.

The process 500*a* continues at step 530 where a telephone call is initiated from the web server to the call server 504. The call server 504 may call the callee 510 at step 532. During the telephone call, the call server 504 may announce the caller 508 if the caller 508 provides caller name or other information associated with him or herself (e.g., name associated with a credit card) the caller. Additionally, the call server 504 may provide the callee 510 with one or more options that the callee 510 may select. For example, the options may include enabling the callee 510 to be connected with the caller 508, disconnect the caller 508, block the caller 508, or disconnect the caller 508 and connect to an operator to report the caller 508 as an unwanted caller. In association with the options, the announcement may request that the callee 510 press or say numbers (e.g., "press "1" to accept the call from Bob from Dallas, press "2" to disconnect the call, press "3" to block the calls press "0" to connect with an operator"). In selecting the options, the callee 510 may press a number on a keypad of the telephone associated with the telephone number or respond verbally if the call server 504 is configured for voice responses to the options. The selection occurs at step 532. At step 536, the call server 504 communicates the selected option to the web server 502. The web server 502 stores the call information in the CNAM database 506. If the callee 510 selected the option to connect to the caller 508, then the parties are connected at steps 540*a*, 540*b*, and 540*c*. As shown, the web server 502 and/or call server 504 may be part of the communication link between the caller 508 and callee 510 to ensure anonymous communication from the caller 508 to the callee 510.

Figure 5B:
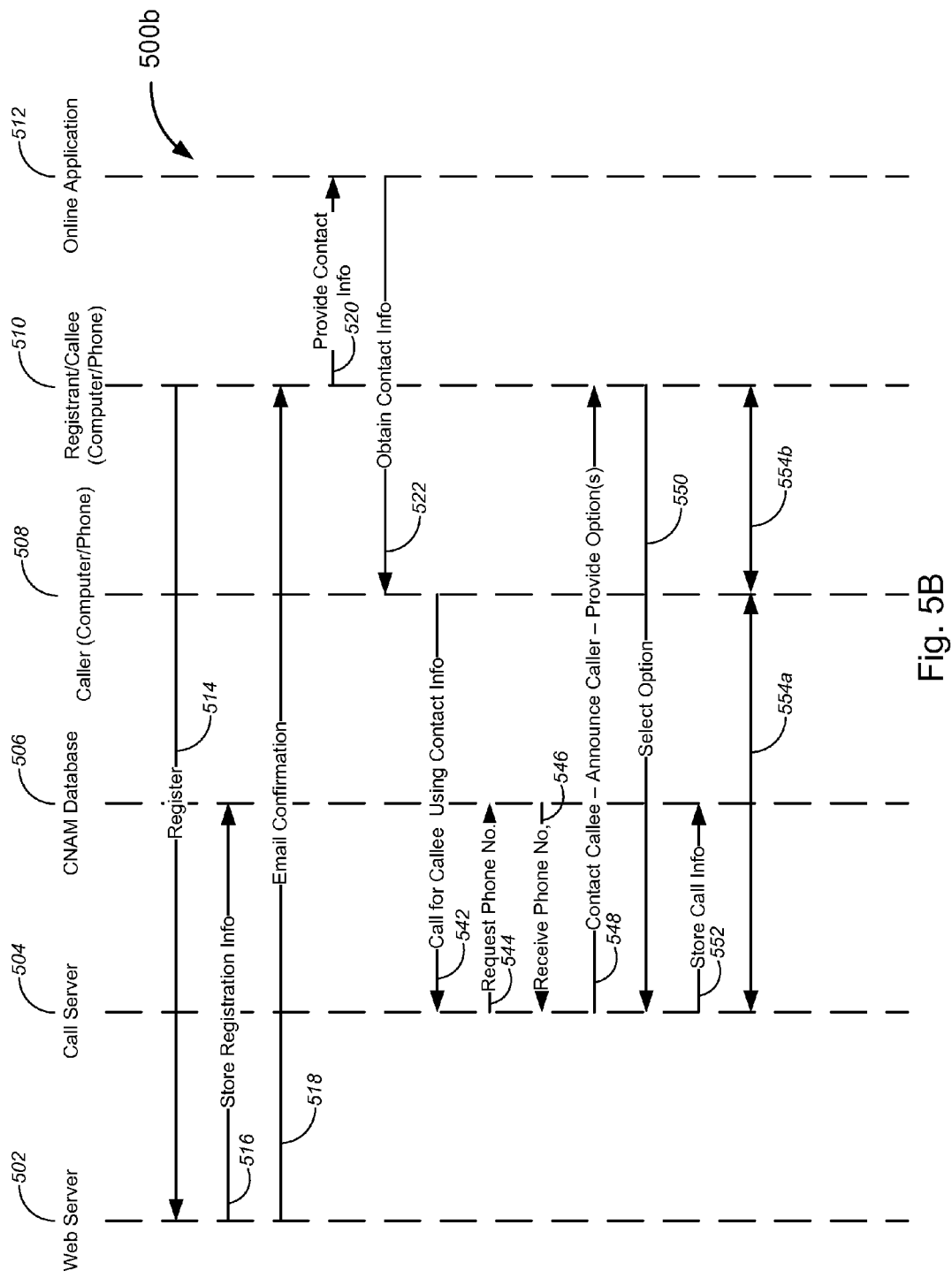

FIG. 5B is a diagram of an exemplary interactive process 500*b* for enabling a user to anonymize his or her telephone number. The process is the same as the process shown in FIG. 5A through step 522, where the caller 508 obtains the contact information (e.g., identifier of the registrant/callee 510) via the online application 512. At step 542, the caller 508 may use a telephone to call the call server 504 for the callee 510 using the contact information provided by the callee 510. Payment information for placing the call may also be provided by the caller 508 at this step. The call server 504 may receive the contact information verbally, if using voice recognition software, or via a dual-tone multiple frequency (DTMF) signal from a keypad of the telephone of the caller 508 if configured to receive and process DTMF signals. At step 544, the call server 504 may request the callee's telephone number from the CNAM database 506 using the contact information. The CNAM database 506 may respond so that the call server 504 receives the telephone number of the callee 510 at step 546.

At step 548, the call server 504 may contact the callee 510. The call may include an announcement to the callee 510 of the caller 508 using caller-supplied identification information and/or provide options to the callee 510 for accepting or rejecting the telephone call as described in more detail with regard to FIG. 5A. The caller information may be requested by the caller server 504 in response to receiving the call at step 542 from the caller 508. At step 550, the callee 510 may select an option, if presented, and the option is delivered to the call server 504 at step 550. At step 552, the call information may be stored by the call server 504 in the CNAM database 506. At steps 554*a* and 554*b*, the caller 508 and callee 510 may be connected to speak on the telephone. The call server 504 may remain in the communication path to ensure that the callee's telephone number remains anonymous.

Figure 6:
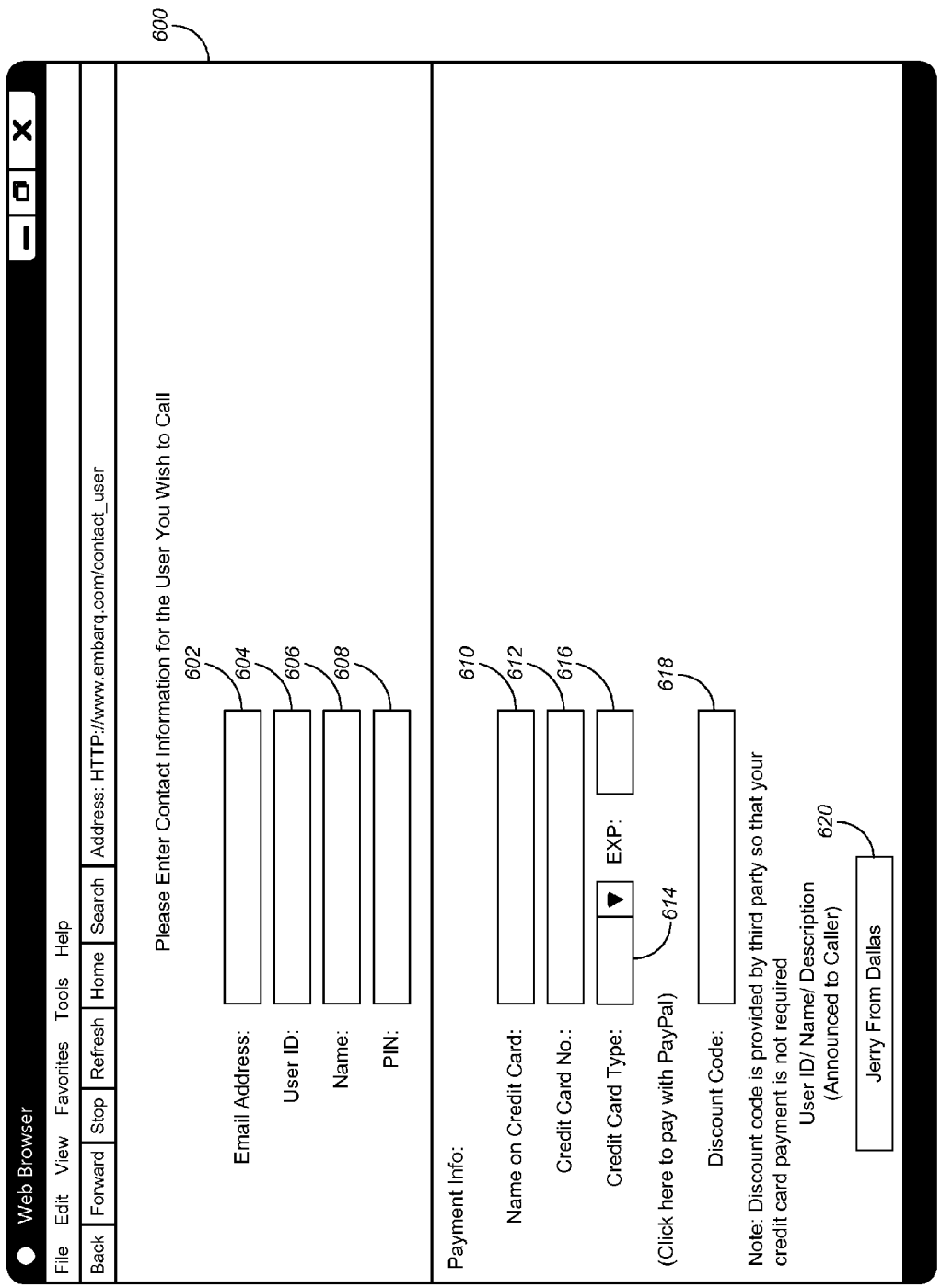
FIG. 6 is an illustration of an exemplary website for a user to lookup and call another user who has registered his or her telephone number to receive anonymous telephone calls.

FIG. 6 is an illustration of an exemplary website 600 for a user to lookup and call another user who has registered his or her telephone number to receive anonymous phone calls. The user may enter the contact information of the user he or she is attempting to call in a text entry field. For example, the contact information may include an email address 602, user ID 604, name 606, or PIN number 608. Any one of these contact information possibilities may be utilized in accordance with the principles of the present invention. To pay for the call, the caller may enter a name on a credit card 610, credit card number 612, credit card type 614, and expiration date 616. Alternatively, the caller may pay using a debit card, PayPal, or other online payment service as understood in the art. A discount code 618 may be utilized if provided by a third party so that the caller does not have to pay. Such a discount code may be provided by a retailer, for example, to inspire callers to call and place orders, purchases, or otherwise contact the retailer. In addition, the user may provide a user ID, name, or description that may be announced to the callee in a text entry field 620. It should be understood, however, that the announcement may include a name on the credit card being used to pay for the telephone call.

Figure 7:
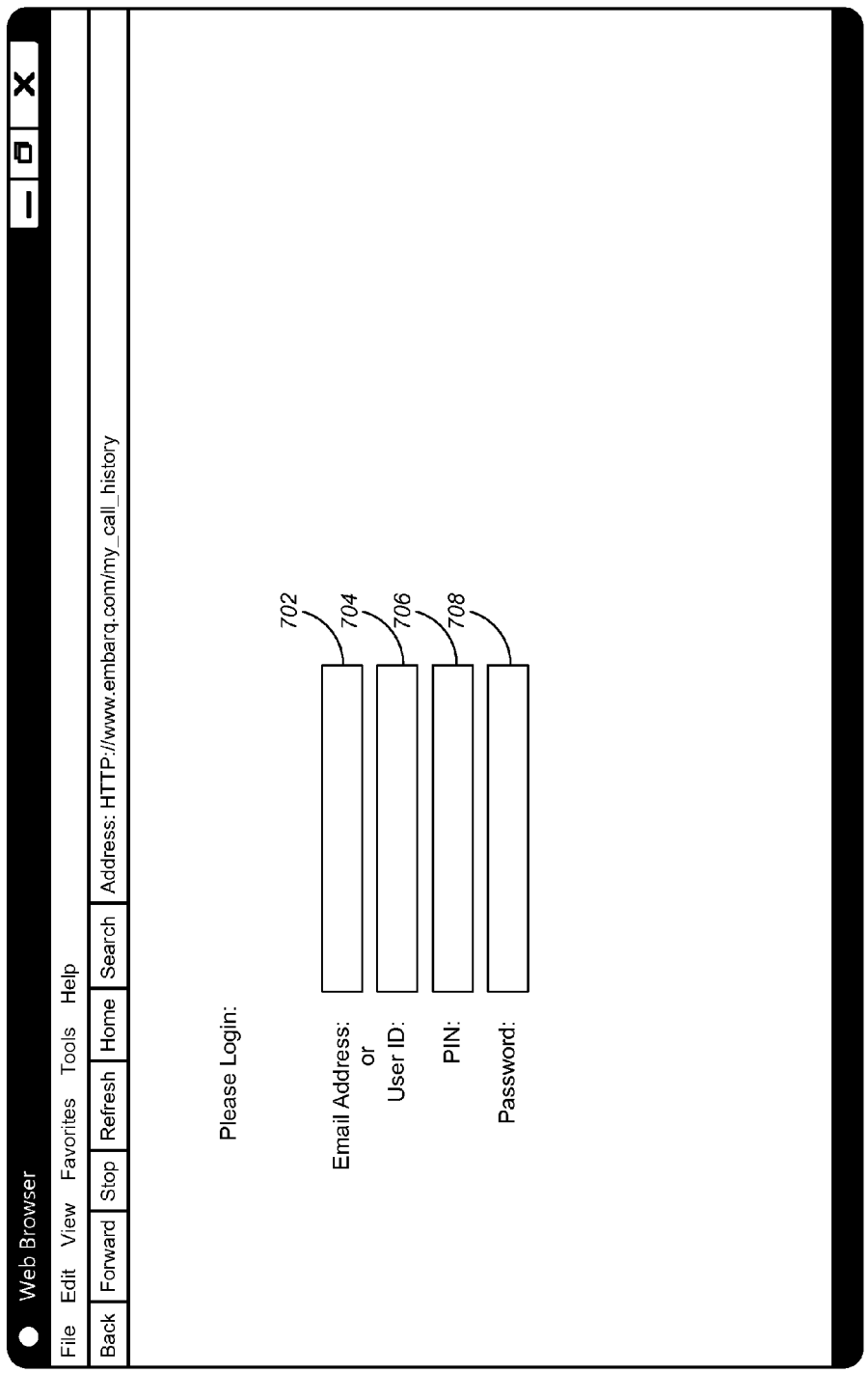
FIG. 7 is an illustration of an exemplary website for a user who has registered his or her telephone number to be called anonymously to log into a system to review and manage his or her call history.

FIG. 7 is an illustration of an exemplary website 700 for a user who has registered his or her telephone number to be called anonymously to log into a system to review and manager his or her call history. As shown, the user may enter an email address 702 or user ID 704, a personal identification number (PIN) 706 and/or password 708. It should be understood that any log-in technique as understood in the art may be utilized in accordance with the principles of the present invention.

Figure 8:
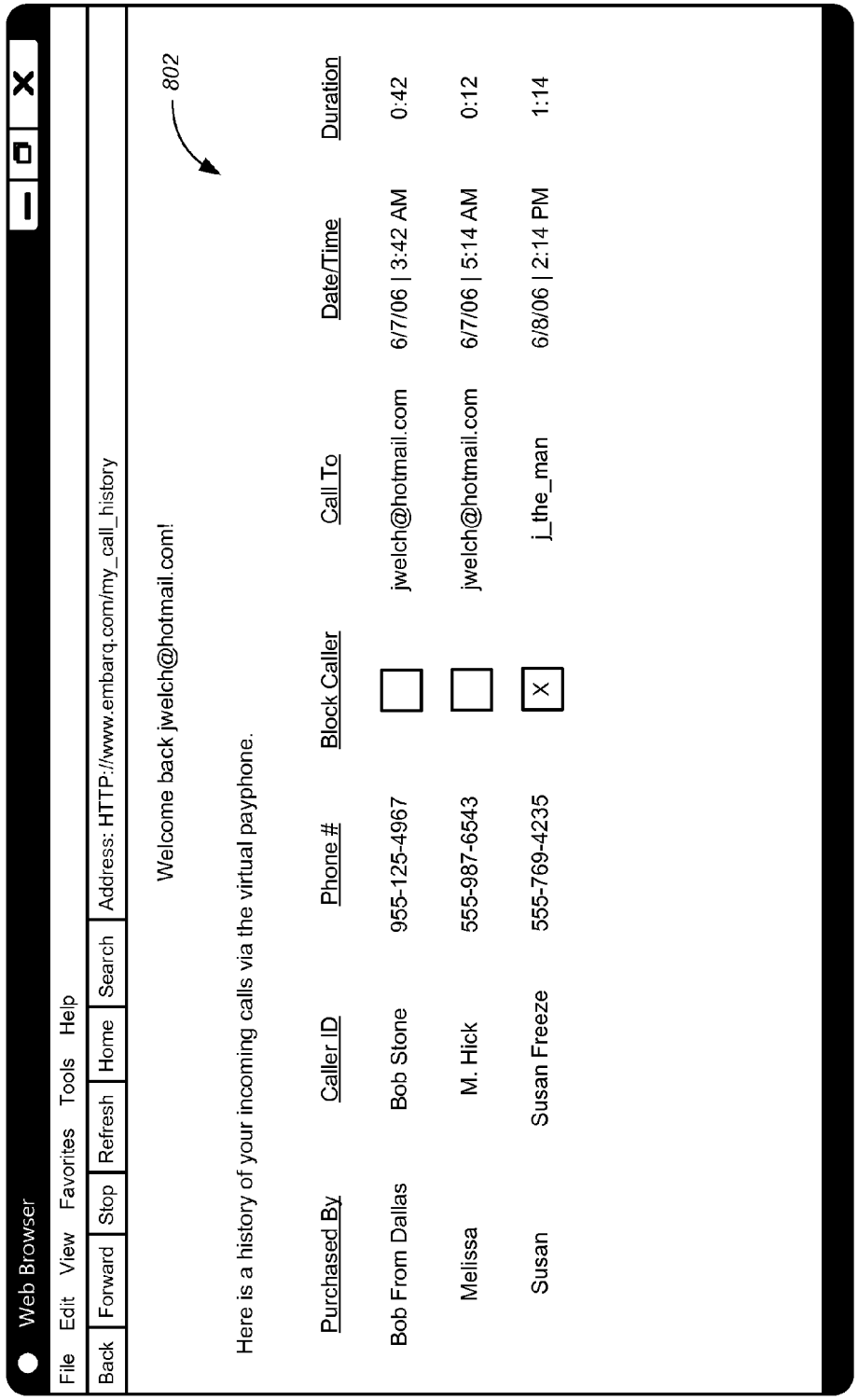
FIG. 8 is an illustration of an exemplary website that lists a user's call history and enables the user to manage certain aspects thereof.

FIG. 8 is an illustration of an exemplary website 800 that lists a user's call history and enables the user to manage certain aspects thereof. As shown, the website 800 may include a list of call history information. The call history may include names or other information of a person who purchased calls to the user, caller ID information of persons who called the user, and phone numbers that called the user. Selection mechanisms may be provided for the user to select whether or not to block one or more callers. The call blocking may enable the system to block a caller based on a name, credit card number, telephone number, user ID, or any other identifier associated with a blocked user. Still yet, a user may block all callers who block their caller ID by user "*67" before placing the call as understood in the art. In addition, identifiers of who was called may be provided in the list. As shown, the identifiers include "jwelch@hotmail.com" and "j_the_man," thereby indicating that the same telephone number called to the user had two different identifiers associated with that telephone number. Additionally, date and time information and duration of the call information may be provided in the call history list.

In addition to managing call history, a user may manage his or her profile. Profile management may be important to some users who want to prevent calls to the anonymized telephone during certain hours or limit calls to a particular identifier (e.g., email address) during certain times. For example, a user may access a webpage (not shown) and set times (e.g., 2:00am and 8:00pm) between which calls are unable to be placed to the anonymized telephone number. There may be many reasons for limiting callers to call the anonymized telephone number. For example, the user may work at home and only want professional calls to be placed to the anonymized telephone number during business hours, the user may have children who the user does not want to have contact with his or her online contacts, and so on.

The principles of the present invention may provide many features and services that are not possible with conventional telephone systems. However, many conventional telephone services may be utilized in accordance with the principles of the present invention, including call forwarding, call waiting, caller ID, etc.

Figure 9:
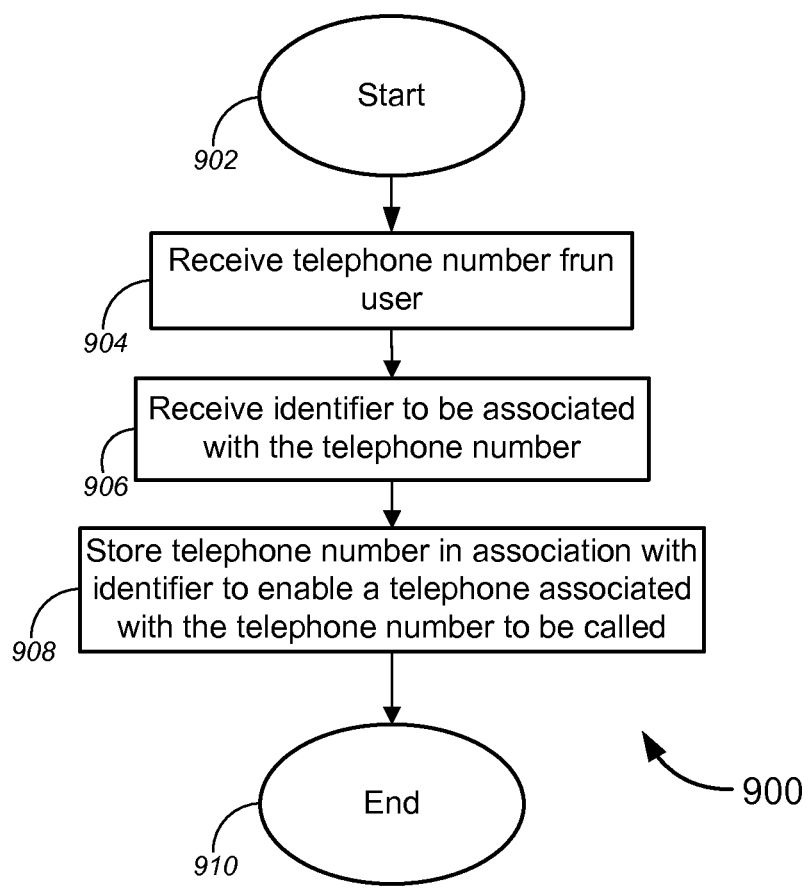
FIG. 9 is a flow diagram of an exemplary process for establishing a user to receive telephone calls anonymously.

FIG. 9 is a flow diagram of an exemplary process 900 for establishing a user to receive telephone calls anonymously. The process 900 starts at step 902. At step 904, a telephone number is received from a user. The telephone number may be associated with a telephone connected to a public switch telephone network or mobile telephone system, for example. It should be understood that the telephone may be connected to any telecommunications network At step 906, an identifier to be associated with the telephone number may be received. The identifier may be an email address, user-established user ID, or any other identifier associated with the telephone number. At step 908, the telephone number is stored in association with the identifier to enable a telephone associated with the telephone number to be called. In one embodiment, the telephone number and identifier are stored in a calling name database managed by a telecommunications service provider. Alternatively, the telephone number and identifier may be stored in any other database located on a network that may be looked up during a telephone call to the user from any other user of a telecommunications service provider telecommunications services. The process 900 ends at step 910.

Figure 10:
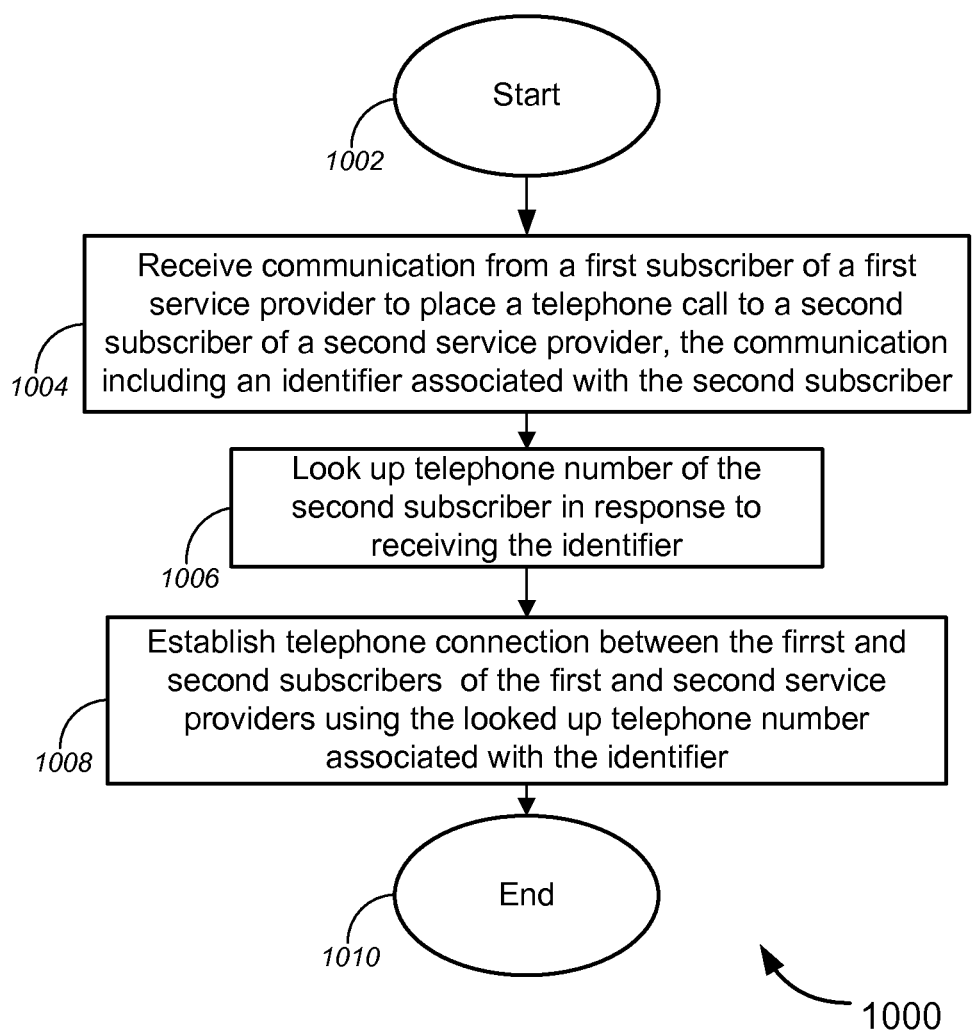
FIG. 10 is a flow diagram of an exemplary process for enabling a user to be called anonymously.

FIG. 10 is a flow diagram of an exemplary process 1000 for enabling a user to be called anonymously. The process 1000 starts at step 1002. At step 1004, a communication from a first subscriber of a first service provider to place a telephone call to a second subscriber of a second service provider is received. The communication includes an identifier associated with the second subscriber. At step 1006, the telephone number of the second subscriber is looked up in response to receiving the identifier. At step 1008, a telephone connection is established between the first and second subscribers of the first and second service providers using the looked-up telephone number associated with the identifier. The process 1000 ends at step 1010. By utilizing this process, the callee's telephone number remains anonymous to the caller.

Figure 11:
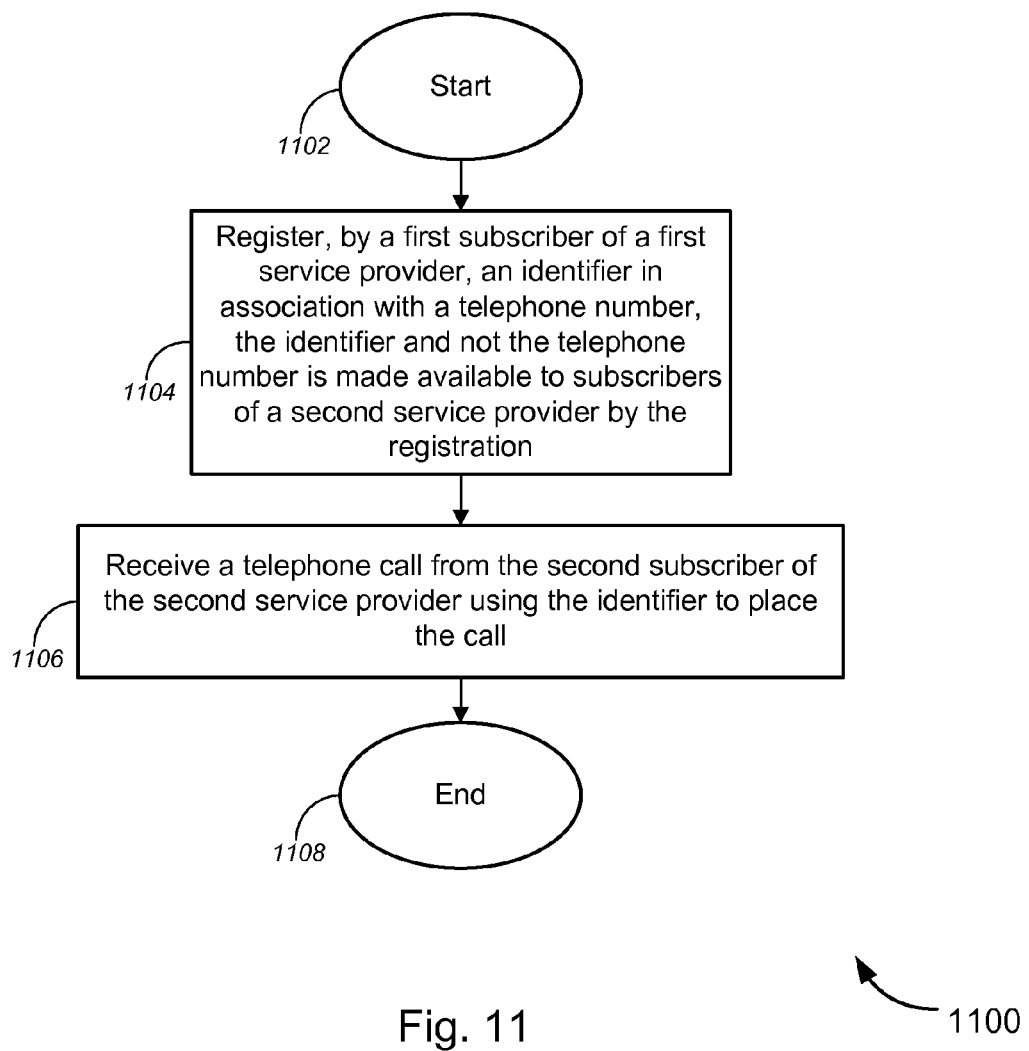
FIG. 11 is a flow diagram of an exemplary process for receiving a telephone call anonymously.

FIG. 11 is a flow diagram of an exemplary process 1100 for receiving a telephone call anonymously. The process 1100 starts at step 1102. At step 1104, a first subscriber of a first service provider may register an identifier in association with a telephone number. The identifier and not the telephone number may be available to subscribers of a second service provided by the registration. By making the identifiers available and not the telephone numbers, the telephone numbers remain anonymous to others attempting to look up the first subscriber. At step 1106, a telephone call from the second subscriber of a second service provider using the identifier to place the call may be received. The process 1100 ends at step 1108.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for establishing a user to receive telephone calls, the method comprising:
  receiving, at a web server, a telephone number from a first user;
  receiving, at the web server, an identifier, supplied by the first user, to be associated with the telephone number;
  storing the telephone number in association with the identifier;
  providing, via the web server, a registry of identifiers searchable by a plurality of users, the registry including the identifier;
  receiving, at the web server, a selection of the identifier from a second user, via the registry of identifiers, desiring to communicate with the first user at a telephone associated with the telephone number;
  retrieving, at the web server, the telephone number associated with the identifier;
  initiating, with the web server, a communication to the telephone number associated with the identifier; and
  connecting the second user with the communication to the telephone number to provide communication between the first user and the second user, wherein the telephone number is concealed from the second user throughout the communication between the second user and the first user.

2. The method according to claim 1, wherein receiving the telephone number includes receiving a telephone number configured to operate on the public switched telephone network (PSTN) or a mobile telephone network.

3. The method according to claim 1, wherein receiving an identifier includes receiving an email address.

4. The method according to claim 1, wherein receiving an identifier includes receiving a user-established user ID.

5. The method according to claim 1, wherein storing includes storing the telephone number and identifier in a database configured to enable the telephone to be looked up via the identifier.

6. The method according to claim 1, further comprising storing a password in association with the telephone number and identifier.

7. The method according to claim 1, further comprising storing personal profile information of the user in association with the telephone number and identifier.

8. The method according to claim 1, wherein the database is further configured to store information to block particular users from using the identifier to communicate with the first user.

9. The method according to claim 1, wherein the database is further configured to store times during which the identifier can be used to communicate with the first user.

10. The method according to claim 1, wherein the communication between the first user and the second user is a telephone call.

11. A system for establishing a user to receive telephone calls, the system comprising:
a web server; and
a database in communication with the server, the database configured to store a registry of identifiers searchable by a plurality of users, each of the identifiers associated with one or more telephone numbers, wherein the web server is programmed to:
host a website with an interface for a first user to enter a telephone number and an identifier;
receive the identifier, supplied by the first user, to be associated with the telephone number;
store the telephone number in the registry, in association with the identifier;
provide a registry of identifiers to a second user, the registry including the identifier;
receive a selection of the identifier from the second user desiring to communicate with the first user at a telephone associated with the telephone number;
retrieve the telephone number associated with the identifier;
initiate a communication to the telephone number associated with the identifier; and
connect the second user with the communication to the telephone number to provide communication between the first user and the second user, wherein the telephone number is concealed from the second user throughout the communication between the second user and the first user.

12. The system according to claim 11, wherein the telephone number is a telephone number configured to operate on the public switched telephone network.

13. The system according to claim 11, wherein the identifier is an email address.

14. The system according to claim 11, wherein the identifier is a user- established user ID.

15. The system according to claim 11, wherein the database is configured to enable a users to look up the telephone number via the identifier.

16. The system according to claim 11, wherein the database is further configured to store a password in association with the telephone number and identifier.

17. The system according to claim 11, wherein the web server is further configured to store personal profile information of the user in association with the telephone number and identifier.

18. The system according to claim 11, wherein the database is further configured to store information to block particular users from using the identifier to communicate with the first user.

19. The system according to claim 11, wherein the database is further configured to store times during which the identifier can be used to communicate with the first user.

20. The system according to claim 11, wherein the communication between the first user and the second user is a telephone call.

* * * * *